United States Patent
Soltner et al.

(10) Patent No.: US 11,367,428 B2
(45) Date of Patent: Jun. 21, 2022

(54) NOISE-CANCELING HEADREST FOR VEHICLE SEAT

(71) Applicant: FAURECIA Sièges d'Automobile, Nanterre (FR)

(72) Inventors: Stéphane Soltner, Mailleroncourt Charrette (FR); Camille Georges, Sartrouville (FR); Xenofon Doukopoulos, Massy (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/104,667

(22) Filed: Nov. 25, 2020

(65) Prior Publication Data
US 2021/0166675 A1    Jun. 3, 2021

(30) Foreign Application Priority Data
Nov. 29, 2019   (FR) ...................................... 1913547

(51) Int. Cl.
*G10K 11/178* (2006.01)
*H04M 9/08* (2006.01)

(52) U.S. Cl.
CPC ......... *G10K 11/17881* (2018.01); *H04M 9/08* (2013.01); *G10K 2210/1282* (2013.01);
(Continued)

(58) Field of Classification Search
CPC ...... H04R 5/02; H04R 5/023; H04R 2499/15; B60N 2/80; B60N 2/806; B60N 2/865; B60N 2/868; B60N 2/885; G10K 11/178; G10K 11/17815; G10K 11/17813; G10K 11/17854; G10K 11/17879; G10K 11/17881; G10K 2210/128; G10K 2210/1281; G10K 2210/1282;
(Continued)

(56) References Cited

U.S. PATENT DOCUMENTS 5,133,017 A     7/1992  Cain
9,431,001 B2 *  8/2016  Cherkassky ..... G10K 11/17823
(Continued)

FOREIGN PATENT DOCUMENTS

CN    109159734 A    1/2019
DE    102013202810 A1    8/2014
(Continued)

OTHER PUBLICATIONS

French Search Report for French App. No. FR1913547 dated Aug. 28, 2020, BET200356 FR, 15 pages.

*Primary Examiner* — Kile O Blair
(74) *Attorney, Agent, or Firm* — Barnes & Thornburg LLP

(57) ABSTRACT

A noise-canceling headrest for a vehicle seat, comprising a central part and two side parts, at least one loudspeaker, a microphone, an audio source playback module capable of transmitting an audio signal to the loudspeaker, a noise sensor, and a signal processing circuit configured for: receiving a noise signal and determining a noise correction function, receiving an error signal from the microphone, and updating the noise correction function, generating a noise correction signal by applying the noise correction function to the noise signal, generating a control signal intended for the loudspeaker, by adding together the noise correction signal and the audio signal.

16 Claims, 6 Drawing Sheets

(52) U.S. Cl.
CPC ............... *G10K 2210/3026* (2013.01); *G10K 2210/3027* (2013.01); *G10K 2210/3044* (2013.01); *G10K 2210/3046* (2013.01); *G10K 2210/3221* (2013.01)

(58) Field of Classification Search
CPC ... G10K 2210/1283; G10K 2210/3221; G10K 2210/3225
See application file for complete search history.

(56) References Cited

U.S. PATENT DOCUMENTS

| | | | |
|---|---|---|---|
| 9,454,952 B2* | 9/2016 | Tzirkel-Hancock | ........................ G10K 11/17875 |
| 2008/0260174 A1 | 10/2008 | Yokota | |
| 2016/0027428 A1 | 1/2016 | Gul | |
| 2016/0029111 A1 | 1/2016 | Wacquant | |
| 2018/0190259 A1 | 7/2018 | Woelfl | |
| 2018/0281965 A1* | 10/2018 | Pons | ...................... B60N 2/879 |
| 2019/0027128 A1 | 1/2019 | Araki | |
| 2020/0105242 A1* | 4/2020 | Griffin | ............. G10K 11/17854 |
| 2020/0189436 A1 | 6/2020 | Soltner | |
| 2020/0380948 A1* | 12/2020 | Honda | ................... H04R 3/005 |

FOREIGN PATENT DOCUMENTS

| | | | |
|---|---|---|---|
| EP | 3002152 A1 | | 4/2016 |
| JP | 08314474 A | * | 11/1996 |
| JP | 2004016711 A | | 1/2004 |
| WO | 2017048943 A1 | | 3/2017 |
| WO | 2017160594 A1 | | 9/2017 |
| WO | 2019166075 A1 | | 9/2019 |

* cited by examiner

NOISE-CANCELING HEADREST FOR VEHICLE SEAT

PRIORITY CLAIM

This application claims priority to French Application No. FR1913547, filed, Nov. 29, 2019, which is expressly incorporated by reference herein.

BACKGROUND

The present disclosure relates to a noise-canceling headrest for a vehicle seat, in particular for a motor vehicle seat. The present disclosure relates more specifically to a noise-canceling headrest for a seat, comprising one or more integrated microphones able to transmit a voice signal.

SUMMARY

According to the present disclosure, a noise-canceling headrest for a vehicle seat comprises a central part and two side parts extending on either side of the central part, the headrest comprising at least one loudspeaker oriented towards a space intended to receive the head of a user, the headrest further comprising a microphone oriented towards the space, wherein either the headrest further comprises an interface with an audio source playback module that is external to the headrest, capable of transmitting an audio signal to the loudspeaker, or the headrest further comprises an audio source playback module that is internal to the headrest, capable of transmitting an audio signal to the loudspeaker, and wherein the headrest further comprises a noise sensor oriented towards the outside of the space, the headrest further comprising a signal processing circuit configured for:

receiving a noise signal from the sensor, and determining a noise correction function by taking the noise signal into account, receiving an error signal from the microphone, and updating the noise correction function by taking the error signal into account, generating a noise correction signal by applying the noise correction function to the noise signal, generating a control signal intended for the loudspeaker, by adding together the noise correction signal and the audio signal.

The error signal corresponds to residual noise in the space. The residual noise may result from a noise correction error.

With these features, a noise-canceling system comprising the signal processing circuit, microphone, sensors, and loudspeaker is a stand-alone system comprised in the headrest. It is thus easy to install in a pre-existing vehicle.

With these features, the noise reduction is significantly improved. In particular, such a headrest makes it possible to reduce the noise by more than an additional 10 dB in comparison to the simple sound insulation of 20 dB that is traditionally obtained, for example within the [100-400 Hz] low frequency range which corresponds to the engine noise of the vehicle and the rolling noise of the vehicle.

The updating of the noise correction function can be carried out in the form of a feedback loop.

In illustrative embodiments, such a headrest may further comprise one or more of the additional features described below.

In one embodiment, the interface may comprise wired signal transmission means, for example such as a cable, or non-wired means, for example such as a wave transmitter/receiver, for example of the Bluetooth type.

In one embodiment, the headrest further comprises a voice module for telephony, capable of receiving a voice signal from the microphone.

Thus, in addition to sending a voice signal to the voice module for telephony, the same microphone allows capturing an error signal and transmitting it to the signal processing circuit.

With either of these features, a personal sound zone can be defined for a user of the headrest.

The user can listen to their own personal audio content in the personal sound zone. For example, the audio source playback module may be a car radio in the vehicle, a media player, for example for CD-ROMs or secure digital memory cards (SD), or even a smart phone.

The voice module for telephony is further capable of transmitting to the loudspeaker an external voice signal received from a party communicating with the user, so that the user can hear the voice of the party inside the personal sound zone.

The user can speak within the personal sound zone so that the voice signal is emitted towards the microphone.

The voice module for telephony is further capable of transmitting voice commands to the vehicle's dashboard or to the user's smartphone. In this case, a voice recognition module allows converting the user's voice into identifiable voice command signals.

When several seats of the same vehicle are each equipped with such a noise-canceling headrest, the vehicle interior can thus advantageously be partitioned into several personal sound zones which are sound-proof relative to one another. Thus, advantageously, each user can make telephone calls or listen to audio content without disturbing or being disturbed by the other users.

In one embodiment, the noise correction function is a function of the noise signal in phase opposition.

The noise correction function is a function of the noise signal in phase opposition, over a frequency range comprised within a range selected from the list consisting of: [0-800 Hz], [0-400 Hz], [100-400 Hz], [0-250 Hz], or [0-200 Hz].

In one embodiment, the microphone is arranged in one of the two side parts.

With these features, the microphone is acoustically isolated in the personal sound zone. This avoids potential reverberation effects. In addition, the microphone can thus capture residual noise near the user's ears, therefore at the location where the actual residual noise is the most annoying.

In one embodiment, the microphone is arranged in a lower part of the one of the two side parts.

With these features, the microphone is close to the user's mouth, in order to capture his or her voice.

In one embodiment, the microphone is arranged at a distal end of the one of the two side parts, so as to be close to both the mouth and the ear of the user.

By virtue of either of these features, the microphone can be capable of capturing both the user's speech and the residual noise close to the user's ear.

In one embodiment, the microphone is a first microphone, and a second microphone is arranged in the other of the two side parts.

In one embodiment, the second microphone is arranged symmetrically with the first microphone.

In one embodiment, the loudspeaker is arranged in one of the two side parts.

In one embodiment, a second loudspeaker is arranged in the other of the two side parts and is also capable of receiving the audio signal and the control signal.

In one embodiment, the central part comprising the noise sensor and each of the two side parts comprising another noise sensor, the noise signal coming from the three noise sensors.

For example, and without limitation, the noise sensor is a microphone or an accelerometer.

In one embodiment, each noise sensor is configured to receive noise and to emit a partial noise signal, the noise signal being a function of the three partial signals.

In one embodiment, the function of the three partial signals is a weighted average of the partial signals, the weighting taking into account a respective location of each noise sensor.

In one embodiment, the central part is a support structure and the two side parts are side wings, so as to define a noise cancellation zone between the side wings, the control signal to the loudspeaker making it possible to cancel noise in the noise cancellation zone.

The personal sound zone thus comprises the internal noise cancellation zone.

In one embodiment, the side wings are movably mounted on the support structure.

In one embodiment, the side wings are pivotably mounted on the support structure.

In an alternative example, the side wings are mounted to be retractable, for example via a slide system, on the support structure.

According to another aspect, a vehicle seat is described comprising a seating portion, a backrest, and a headrest as described above in any of its combinations, mounted on the backrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements. For brevity, only those elements which are useful in understanding the described embodiments are represented in the figures and are described in detail below.

In the following description, when reference is made to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified these are in reference to the orientation of the figures or of a seat in its normal position of use.

Figure 1:
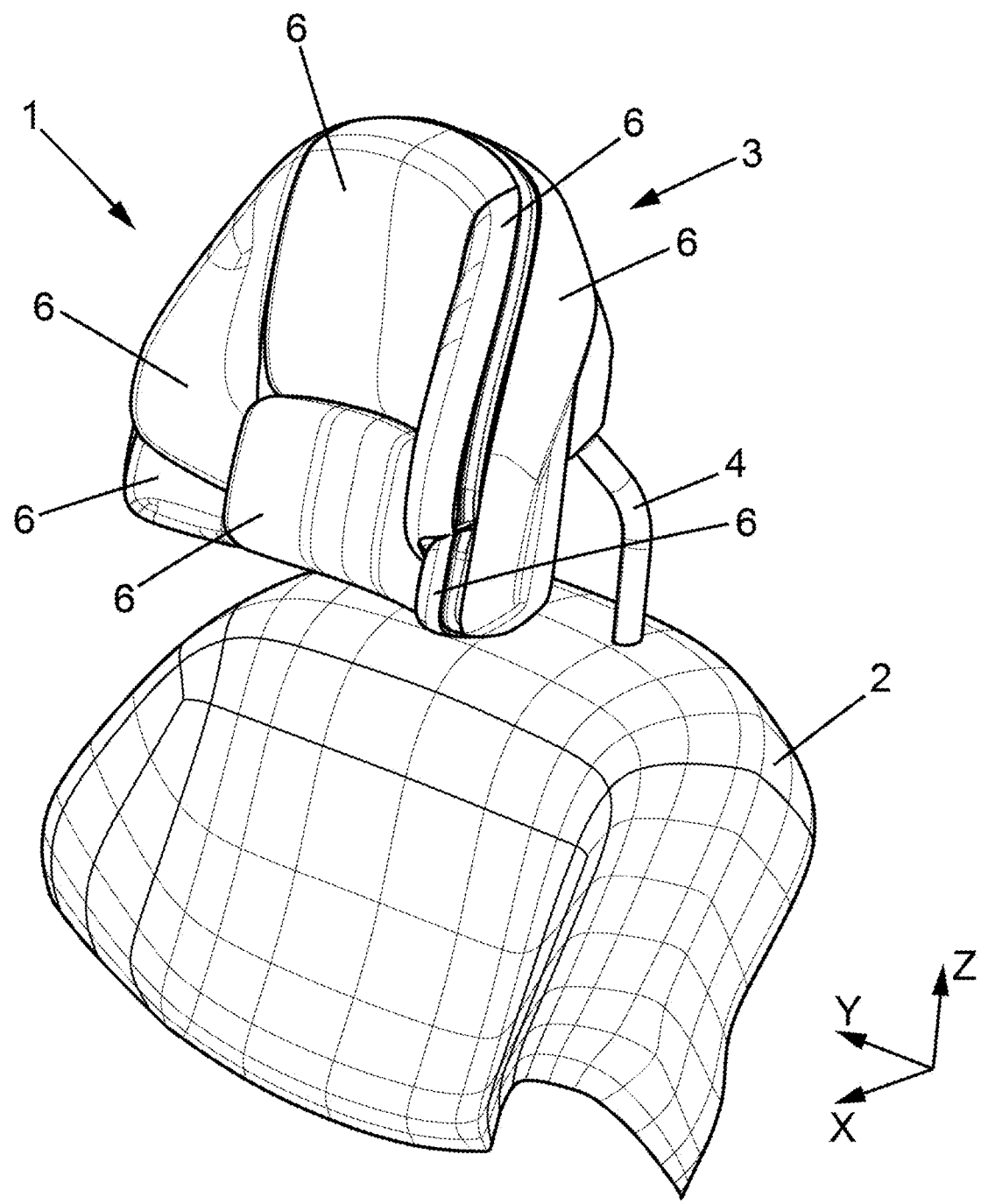
FIG. 1 shows part of a motor vehicle seat.

FIG. 1 schematically represents details of a motor vehicle seat 1.

In the following, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of travel of the vehicle. The transverse direction Y is the transverse direction of the seat. The transverse direction of the seat thus corresponds to the transverse or lateral direction of the motor vehicle. This transverse direction corresponds to a direction perpendicular to the normal direction of travel of the vehicle. Finally, the vertical direction Z is a vertical direction of the seat, perpendicular to the longitudinal and transverse directions.

The seat 1 comprises a seating portion (not shown) having a seating portion frame, on which is mounted a backrest 2 having a backrest frame, generally pivoting about a transverse axis by a hinge mechanism. The seating portion may be mounted on movable profiles, also called slides or male profiles, by means of feet or crossmembers. Each movable profile is part of a runner and is associated with a fixed profile. The fixed profile is fixed to the floor of a motor vehicle.

The seat 1 also comprises a headrest 3 fixed to the backrest frame by means of two rods 4.

More specifically, the rods 4 connect a headrest frame 5 to the backrest frame. One or more coverings 6 are fixed to this headrest frame to improve the comfort for the occupant of the seat 1 and/or the aesthetics of the headrest 3.

The following description refers to FIGS. 1 to 5 to describe the headrest 3 more precisely.

The headrest frame 5 here has a cup shape, providing a substantially planar support structure 5c, from which two side wings 5a, 5b extend from its side ends. The headrest frame 5 thus has a shape adapted to partially encompass the head of the occupant of the seat 1. In particular, the side wings 5a, 5b are thus adapted to be arranged near the ears of the occupant of the seat, being oriented substantially facing the ears of the occupant of the seat 1.

The support structure 5c is intended to receive the back of the head of a user 7, such that the user can rest his or her head thereon.

The side wings 5a, 5b are intended to form a physical noise barrier around the user's head to facilitate the sound insulation of an internal zone 8 at the cup, called the internal noise cancellation zone.

The side wings 5a, 5b are mounted to pivot about a vertical axis on the support structure 5c, between an open position 9 and a closed position 10. In the open position 9, the side wings 5a, 5b together form an angle defining a V-shape in a top view. In the closed position 10, the side wings 5a, 5b together with the support structure 5c define a U-shape in a top view.

Optionally, the side wings 5a, 5b can pivot independently of each other.

Thus, during use, a user can fold the side wings 5a, 5b around his or her face to bring the side wings 5a, 5b near his or her ears and mouth.

Figure 2:
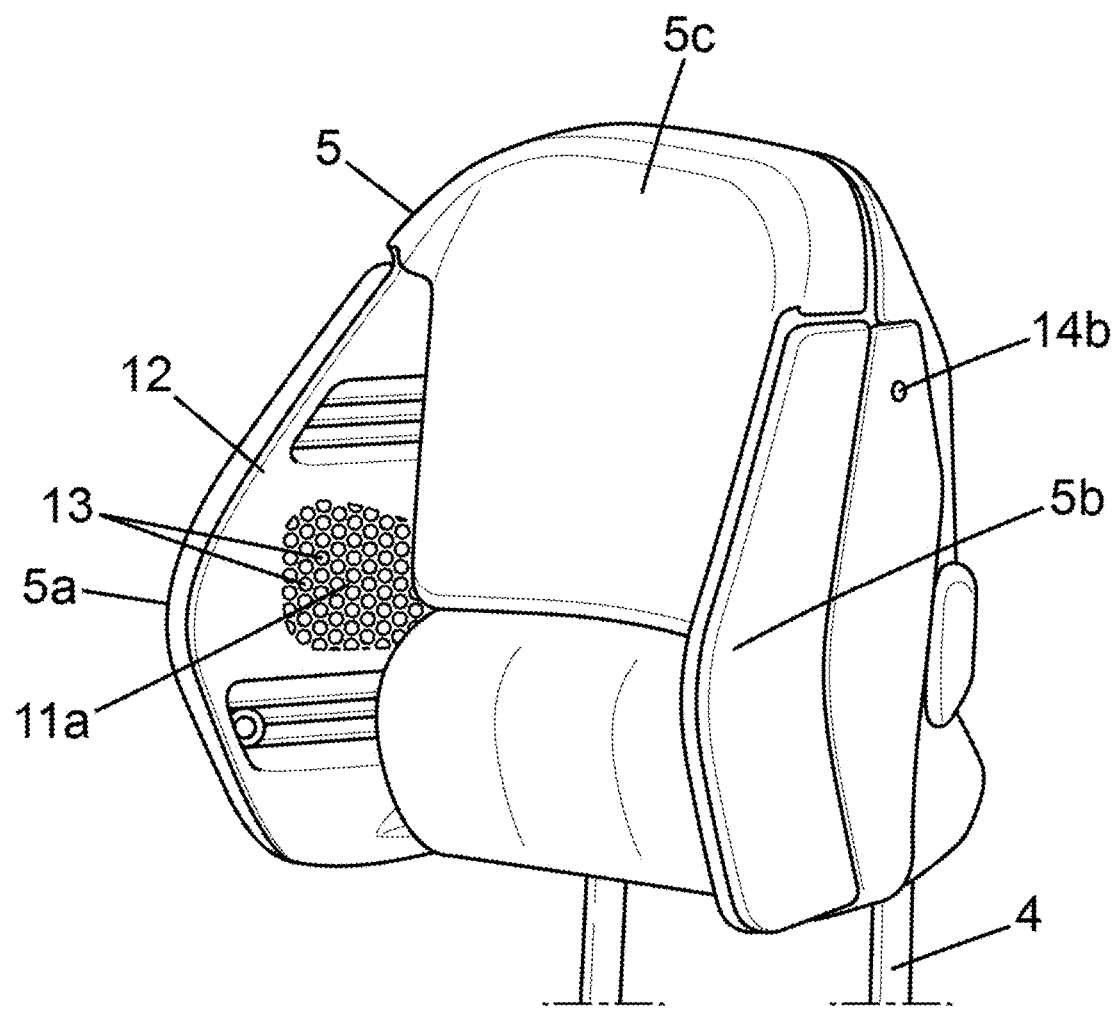
FIG. 2 shows an example of a headrest that can be implemented on the vehicle seat of FIG. 1, from which part of the upholstery has been removed.
Figure 3:
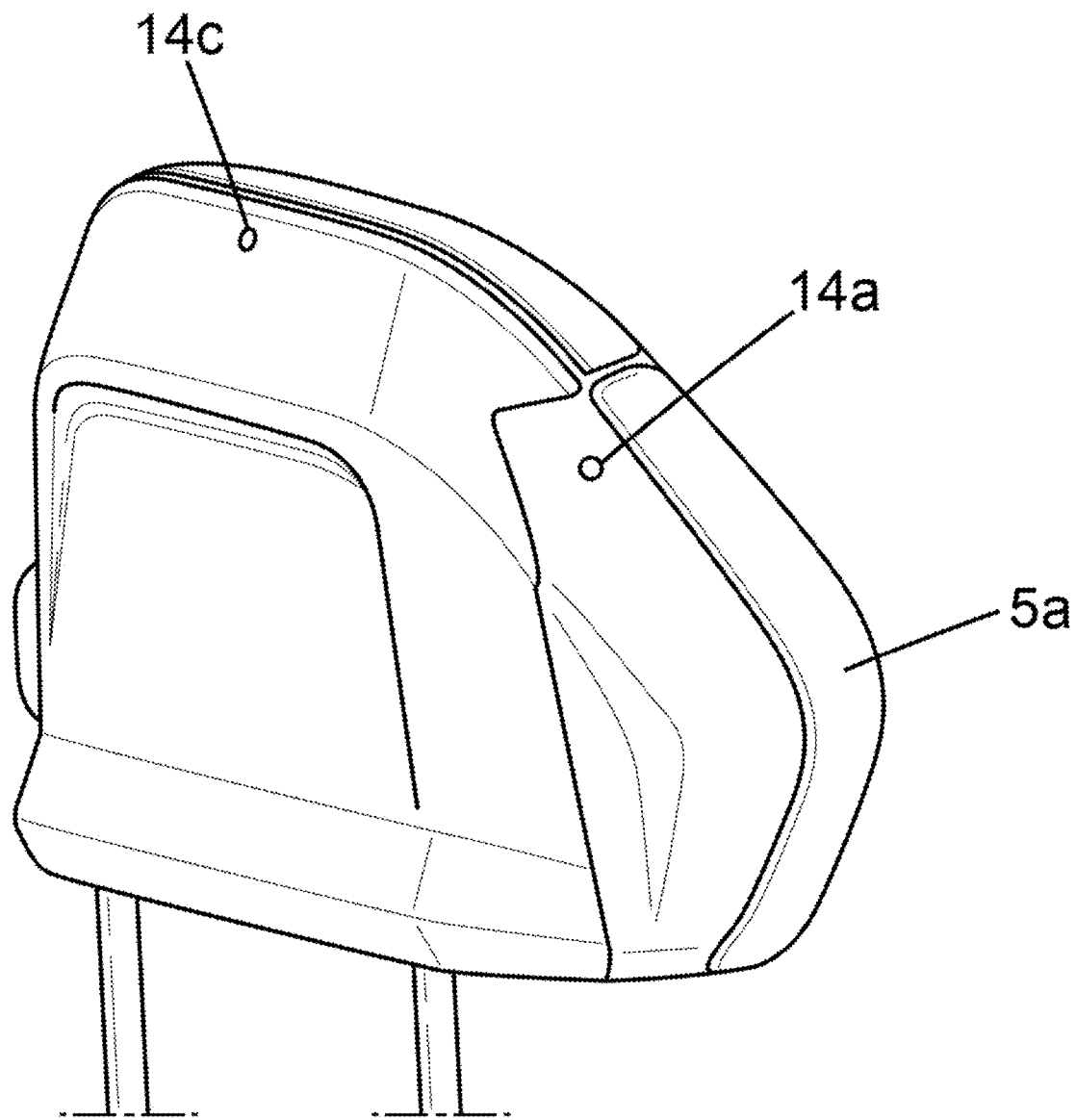
FIG. 3 is a view of the headrest of FIG. 2 from an opposite perspective.
Figure 4:
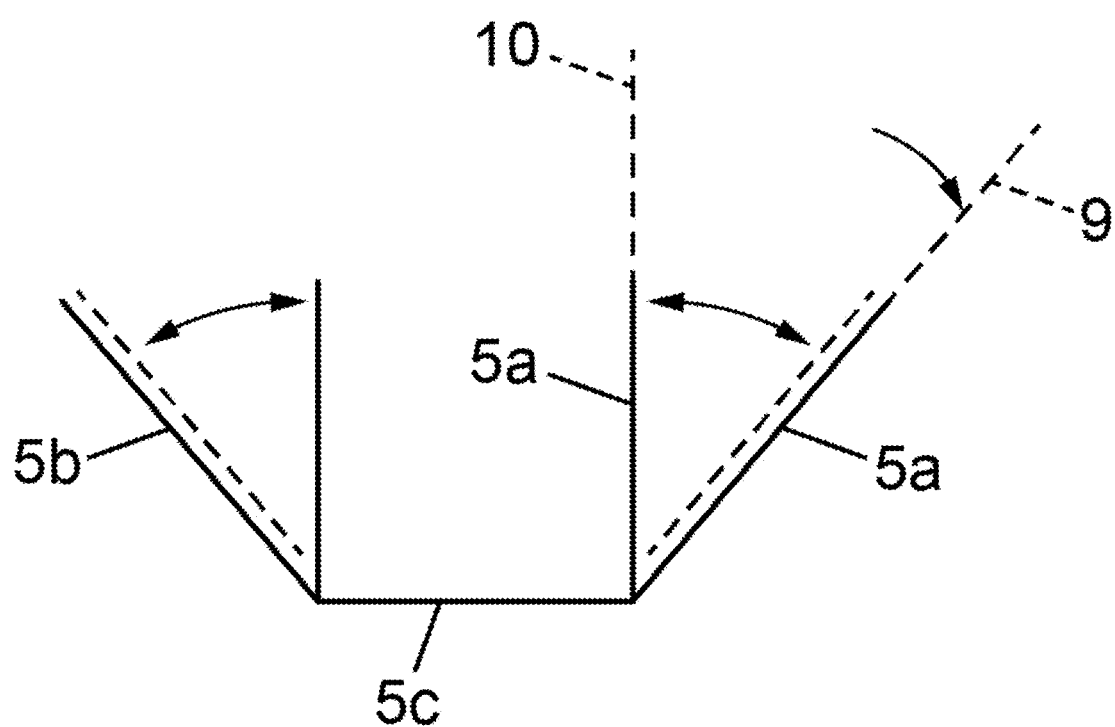
FIG. 4 is a diagram showing two adjustment positions of the headrest of FIGS. 2 and 3.
Figure 5:
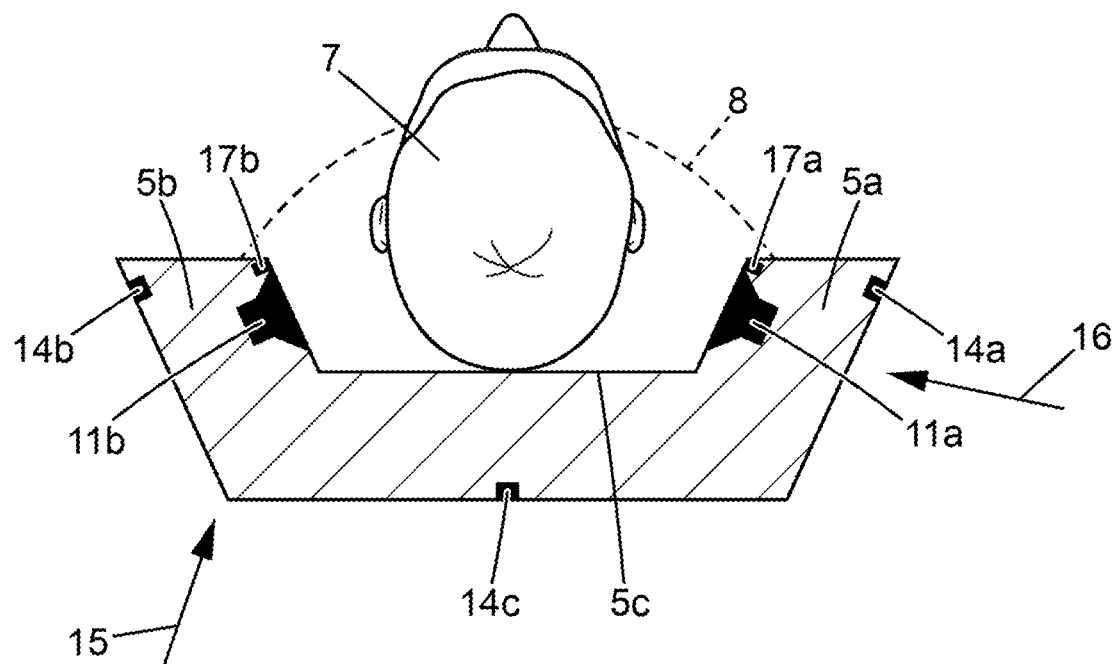
FIG. 5 is a functional diagram of the headrest of FIGS. 2 and 3 during use.

The headrest 3 is also provided with two loudspeakers 11a and 11b, more clearly visible in FIGS. 2 and 5. Each loudspeaker 11a, 11b is arranged in a respective side wing 5a, 5b, and facing towards the internal zone 8.

To achieve this, each side wing 5a, 5b comprises a cavity suitable for receiving the loudspeaker 11a, 11b. In order to protect the loudspeaker membrane, the cavity is closed by a partition 12 pierced with holes 13 allowing sound to circulate from the loudspeaker 11a, 11b to the internal zone 8.

The loudspeakers 11a, 11b are for example full-range type loudspeakers, this type of loudspeaker being suitable for emitting in a wide range of frequencies in a satisfactory manner. The loudspeakers 11a, 11b are preferably chosen with a low threshold frequency, in order to maintain good performance particularly in frequencies below 250 Hz, more particularly in frequencies between 100 Hz and 250 Hz.

As can be seen in FIGS. 2 to 5, the headrest 3 further comprises three noise sensors 14a, 14b, and 14c respectively arranged on the side wings 5a, 5b and the support structure 5c, and oriented towards the outside of the internal zone 8, so that they are collectively able to capture noise 15, 16 coming from different directions in the passenger compartment of the vehicle.

The noise sensors 14a, 14b and 14c are arranged on damping materials, so that they are not disrupted by vibrations from the loudspeakers 11a and 11b.

As can be seen in the figures, the headrest 3 further comprises two microphones 17a and 17b respectively arranged on the side wings 5a and 5b, and oriented towards the inside of the internal zone 8, so that they are collectively able to capture speech coming from the mouth of the user 7, and to capture an error signal due to residual noise present in the internal zone 8.

The loudspeakers 11a and 11b, as well as the microphones 17a and 17b, are connected in the headrest 3 to an interface (not shown) with a voice telephony module. For example, the voice telephony module is integrated into the dashboard of the vehicle or into a telephone. Preferably, the interface allows communication with the voice telephony module by Bluetooth (registered trademark) waves or radio waves.

The headrest 3 thus does not need a wired connection to the vehicle's dashboard. Also, the headrest 3 advantageously has an autonomous telephony function.

Figure 6:
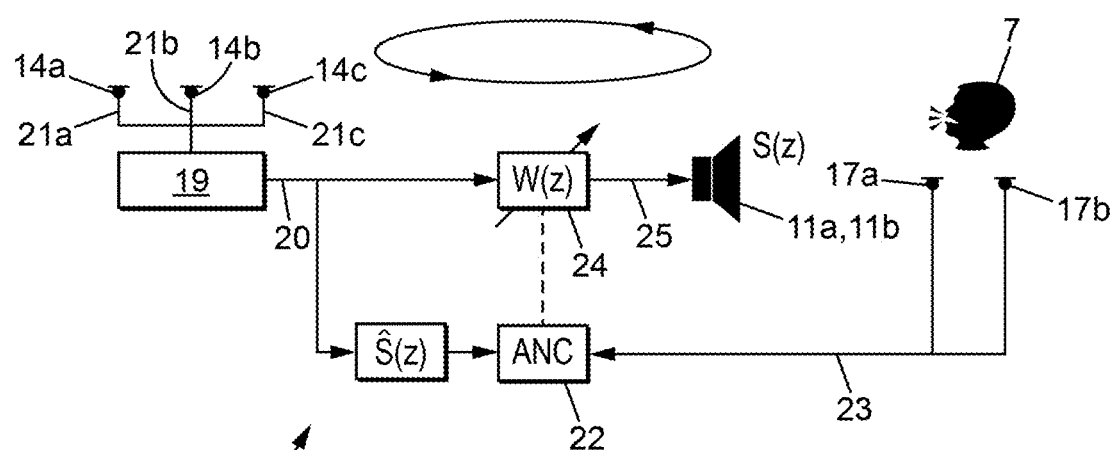
FIG. 6 is a diagram of a signal processing circuit integrated into the headrest of FIGS. 2 and 3.

The headrest 3 further comprises a signal processing circuit 18 as described in FIG. 6. For example, the signal processing circuit 18 is arranged inside the support structure 5c, for example in a dedicated cavity.

The signal processing circuit 18 is electrically connected:
to the loudspeakers 11a and 11b,
to the noise sensors 14a, 14b, and 14c,
to the microphones 17a, 17b.

The signal processing circuit 18 comprises a noise signal generation module 19 configured to calculate a noise signal 20 in response to respective partial noise signals 21a, 21b, 21c respectively received from each of the noise sensors 14a, 14b, and 14c.

More specifically, the noise signal 20 is calculated as a weighted average of the partial noise signals, the weighting depending on the location of each noise sensor 14a, 14b, and 14c. In particular, the weighting depends on the actual location of the noise sensors 14a and 14b. Also, the noise signal generation module 19 is further configured to adjust the weighting according to the open 9 or closed 10 position of the side wings 5a and 5b.

The signal processing 18 comprises an active noise cancellation (ANC) module 22, configured for:
receiving the noise signal 20 from module 19, and determining a noise correction function S(z) by inverting the phase of the noise signal 20,
receiving an error signal 23 from the microphones 17a and 17b, and updating the noise correction function S(z) to take into account the error signal 23, by a feedback loop.

At the output of module 19, the noise signal 20 is duplicated by a parrot module (not shown).

The signal processing circuit 18 further comprises an adaptive filter 24 configured to drive the loudspeakers 11a and 11b.

The adaptive filter 24 is configured to be driven by the noise correction function S(z) from module 22, and furthermore to receive the duplicated noise signal 20 from module 19.

The adaptive filter 24 is thus able to apply the noise correction function S(z) to the noise signal 20 so as to generate a noise correction signal 25.

The adaptive filter 24 is configured to generate a control signal including the noise correction signal 25 intended for the loudspeakers 11a, 11b, in order to drive the loudspeakers 11a, 11b.

The loudspeakers are thus configured to emit noise-canceling sound waves to cancel the noise in the internal zone 8, so that the user 7 is not disturbed by external noise.

The headrest 3 thus autonomously comprises all the elements necessary to ensure an autonomous noise cancellation function.

Such a signal processing circuit 18 is suitable in the case where the microphones 17a and 17b are used only for their function as error signal sensor 23.

Figure 7:
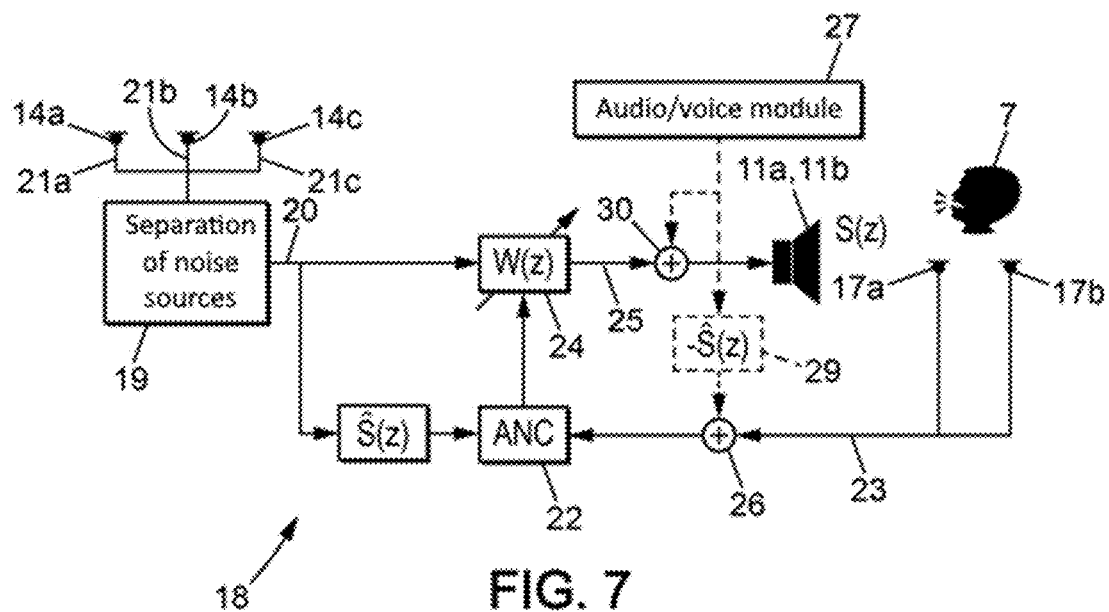
FIG. 7 is a diagram of a variant of the integrated signal processing circuit of FIG. 6.

FIG. 7 represents a more complete advantageous variant of the signal processing circuit 18 of FIG. 6, in which the headrest 3 is also able to deliver audio content to the user 7, and/or able to be used for telephony.

In this variant, the loudspeakers 11a and 11b may also be able to deliver an audio signal (for example audio content or the voice of a speaking party).

The signal processing circuit 18 further comprises an interface (dotted lines) with an audio and voice module 27 comprising an audio source playback module and a telephony module.

Preferably, the interface allows communication by Bluetooth or radio waves with the audio and voice module 27. The audio source playback module is for example a car radio of the vehicle.

The audio and voice module 27 is able to deliver the audio signal, and the interface is able to receive the audio signal and transmit it to an adder module 30.

The adder module 30 is configured to add the noise correction signal 25 coming from the adaptive filter 24, and the audio signal coming from the audio and voice module 27, such that the control signal results from the addition of the noise correction signal 25 and the audio signal.

During use of the headrest in telephony, the microphones 17a and 17b may also be able to capture the voice of the user 7. In this case, a voice signal is transmitted by the microphones 17a and 17b, either in place of or in addition to the noise signal 23.

In order to avoid an echo effect, the speech signal that is output from the audio and voice module 27 is transmitted to an echo canceling filter 29, in order to provide an echo cancellation signal. A second adder module 26 is arranged upstream of module 22. The second adder module 26 is configured to add the echo cancellation signal and the voice signal.

The loudspeakers are thus configured to emit sound waves comprising the audio signal and the noise cancellation, to allow the user 7 to listen to audio content or to the voice of a speaking party within the internal zone 8 without being disturbed by external noise.

Figure 8:
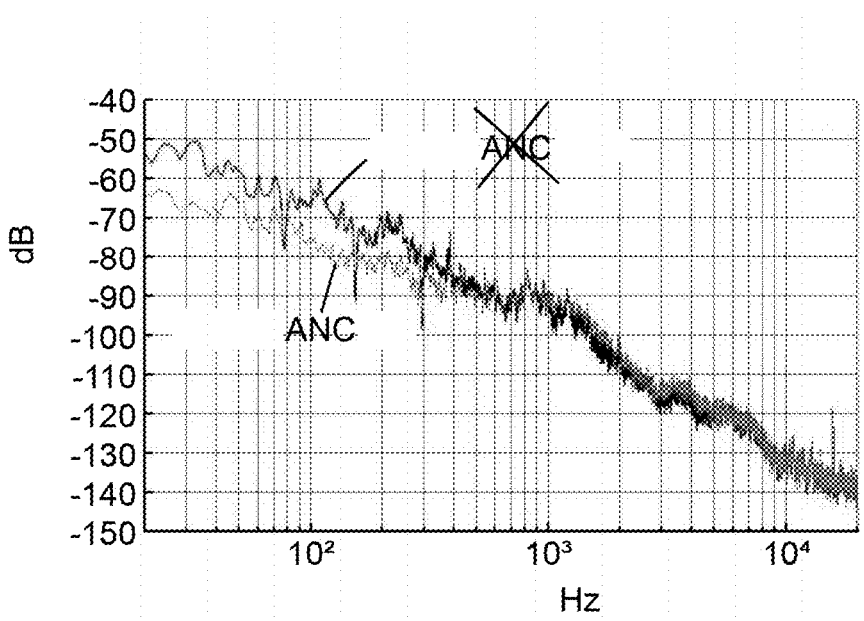
FIG. 8 is a graph showing two comparative captures of the noise level in dB (on the y axis) as a function of the logarithmic frequency (on the x axis), for an ordinary noise cancellation system and for the headrest of FIGS. 2 and 3.

As can be seen in FIG. 8, the noise level in the zone 8 is reduced by the headrest 3 by 10 dB compared to an ordinary noise cancellation system, and for frequencies up to 400 Hz.

The present disclosure is not limited to the advantageous examples described above but is capable of numerous variations accessible to those skilled in the art.

In particular, in the example presented, the headrest 3 comprises exactly two loudspeakers 11a and 11b, three noise sensors 14a, 14b, and 14c, and two microphones 17a and 17b, but any number of each of the aforementioned elements suffices for performing the described function of the headrest 3.

In particular, in the example presented, the headrest 3 comprises side wings 5a and 5b movably mounted on the support structure 5c, but side wings 5a and 5b fixedly mounted on the support structure 5c would suffice for performing the described function of the headrest 3.

A comparative noise-canceling headrest may be equipped on a vehicle seat, with a loudspeaker integrated into the comparative headrest behind the user's head. It is thus possible to emit a sound as close as possible to the ears of the seat occupant in order to cancel out engine noise and rolling noise. However, the noise cancellation may only be partial. There is therefore a desire to improve the noise cancellation. The present disclosure improves the situation.

For this purpose, a noise-canceling headrest for a vehicle seat is disclosed, comprising a central part and two side parts extending on either side of the central part, the headrest comprising at least one loudspeaker oriented towards a space intended to receive the head of a user, the headrest further comprising a microphone oriented towards the space, wherein either the headrest further comprises an interface with an audio source playback module that is external to the headrest, capable of transmitting an audio signal to the loudspeaker, or the headrest further comprises an audio source playback module that is internal to the headrest, capable of transmitting an audio signal to the loudspeaker, and wherein the headrest further comprises a noise sensor oriented towards the outside of the space, the headrest further comprising a signal processing circuit configured for:

receiving a noise signal from the sensor, and determining a noise correction function by taking the noise signal into account, receiving an error signal from the microphone, and updating the noise correction function by taking the error signal into account, generating a noise correction signal by applying the noise correction function to the noise signal, generating a control signal intended for the loudspeaker, by adding together the noise correction signal and the audio signal.

The error signal corresponds to residual noise in the space. The residual noise may result from a noise correction error.

With these features, a noise-canceling system comprising the signal processing circuit, microphone, sensors, and loudspeaker is a stand-alone system comprised in the headrest. It is thus easy to install in a pre-existing vehicle.

With these features, the noise reduction is significantly improved. In particular, such a headrest makes it possible to reduce the noise by more than an additional 10 dB in comparison to the simple sound insulation of 20 dB that is traditionally obtained, for example within the [100-400 Hz] low frequency range which corresponds to the engine noise of the vehicle and the rolling noise of the vehicle.

The updating of the noise correction function can be carried out in the form of a feedback loop.

According to advantageous options, such a headrest may further comprise one or more of the additional features described below.

In one embodiment, the interface may comprise wired signal transmission means, for example such as a cable, or non-wired means, for example such as a wave transmitter/receiver, for example of the Bluetooth type.

In one embodiment, the headrest further comprises a voice module for telephony, capable of receiving a voice signal from the microphone.

Thus, in addition to sending a voice signal to the voice module for telephony, the same microphone allows capturing an error signal and transmitting it to the signal processing circuit.

With either of these features, a personal sound zone can be defined for a user of the headrest.

The user can listen to their own personal audio content in the personal sound zone. For example, the audio source playback module may be a car radio in the vehicle, a media player, for example for CD-ROMs or secure digital memory cards (SD), or even a smart phone.

The voice module for telephony is further capable of transmitting to the loudspeaker an external voice signal received from a party communicating with the user, so that the user can hear the voice of the party inside the personal sound zone.

The user can speak within the personal sound zone so that the voice signal is emitted towards the microphone.

The voice module for telephony is further capable of transmitting voice commands to the vehicle's dashboard or to the user's smartphone. In this case, a voice recognition module allows converting the user's voice into identifiable voice command signals.

When several seats of the same vehicle are each equipped with such a noise-canceling headrest, the vehicle interior can thus advantageously be partitioned into several personal sound zones which are sound-proof relative to one another. Thus, advantageously, each user can make telephone calls or listen to audio content without disturbing or being disturbed by the other users.

In one embodiment, the noise correction function is a function of the noise signal in phase opposition.

The noise correction function is a function of the noise signal in phase opposition, over a frequency range comprised within a range selected from the list consisting of: [0-800 Hz], [0-400 Hz], [100-400 Hz], [0-250 Hz], or [0-200 Hz].

In one embodiment, the microphone is arranged in one of the two side parts.

With these features, the microphone is acoustically isolated in the personal sound zone. This avoids potential reverberation effects. In addition, the microphone can thus capture residual noise near the user's ears, therefore at the location where the actual residual noise is the most annoying.

In one embodiment, the microphone is arranged in a lower part of the one of the two side parts.

With these features, the microphone is close to the user's mouth, in order to capture his or her voice.

In one embodiment, the microphone is arranged at a distal end of the one of the two side parts, so as to be close to both the mouth and the ear of the user.

By virtue of either of these features, the microphone can be capable of capturing both the user's speech and the residual noise close to the user's ear.

In one embodiment, the microphone is a first microphone, and a second microphone is arranged in the other of the two side parts.

In one embodiment, the second microphone is arranged symmetrically with the first microphone.

In one embodiment, the loudspeaker is arranged in one of the two side parts.

In one embodiment, a second loudspeaker is arranged in the other of the two side parts and is also capable of receiving the audio signal and the control signal.

In one embodiment, the central part comprising the noise sensor and each of the two side parts comprising another noise sensor, the noise signal coming from the three noise sensors.

For example, and without limitation, the noise sensor is a microphone or an accelerometer.

In one embodiment, each noise sensor is configured to receive noise and to emit a partial noise signal, the noise signal being a function of the three partial signals.

In one embodiment, the function of the three partial signals is a weighted average of the partial signals, the weighting taking into account a respective location of each noise sensor.

In one embodiment, the central part is a support structure and the two side parts are side wings, so as to define a noise cancellation zone between the side wings, the control signal to the loudspeaker making it possible to cancel noise in the noise cancellation zone.

The personal sound zone thus comprises the internal noise cancellation zone.

In one embodiment, the side wings are movably mounted on the support structure.

In one embodiment, the side wings are pivotably mounted on the support structure.

In an alternative example, the side wings are mounted to be retractable, for example via a slide system, on the support structure.

According to another aspect, a vehicle seat is described comprising a seating portion, a backrest, and a headrest as described above in any of its combinations, mounted on the backrest.

The invention claimed is:

1. A noise-canceling headrest for a vehicle seat, comprising a central part and two side parts extending on either side of the central part, the headrest comprising at least one loudspeaker oriented towards a space intended to receive the head of a user, the headrest further comprising a microphone oriented towards the space, wherein
   either the headrest further comprises an interface with an audio source playback module that is external to the headrest, capable of transmitting an audio signal to the loudspeaker, or
   the headrest further comprises an audio source playback module that is internal to the headrest, capable of transmitting an audio signal to the loudspeaker, and
   wherein the headrest further comprises a noise sensor oriented towards the outside of the space, the headrest further comprising a signal processing circuit configured for:
   receiving a noise signal from the sensor, and determining a noise correction function by taking the noise signal into account,
   receiving an error signal from the microphone, and updating the noise correction function by taking the error signal into account,
   generating a noise correction signal by applying the noise correction function to the noise signal,
   generating a control signal intended for the loudspeaker, by adding together the noise correction signal and the audio signal so as to cancel the noise,
   further comprising: a voice module for telephony, capable of receiving a voice signal from the microphone.

2. The headrest of claim 1, wherein the noise correction function is a function of the noise signal in phase opposition.

3. The headrest of claim 1, wherein the microphone is arranged in one of the two side parts.

4. The headrest of claim 3, wherein the microphone is arranged in a lower part of the one of the two side parts.

5. The headrest of claim 3, wherein the microphone is a first microphone, and wherein a second microphone is arranged in the other of the two side parts.

6. The headrest of claim 5, wherein the second microphone is arranged symmetrically with the first microphone.

7. The headrest of claim 1, wherein the loudspeaker is arranged in one of the two side parts.

8. The headrest of claim 7, wherein a second loudspeaker is arranged in the other of the two side parts and is also capable of receiving the audio signal and the control signal.

9. The headrest of claim 1, the central part comprising the noise sensor and each of the two side parts comprising another noise sensor, the noise signal coming from the three noise sensors.

10. The headrest of claim 9, wherein each noise sensor is configured to receive noise and to emit a partial noise signal, the noise signal being a function of the three partial signals.

11. The headrest of claim 10, wherein the function of the three partial signals is a weighted average of the partial signals, the weighting taking into account a respective location of each noise sensor.

12. The headrest of claim 1, wherein the central part is a support structure and the two side parts are side wings, so as to define a noise cancellation zone between the side wings, the control signal to the loudspeaker making it possible to cancel noise in the noise cancellation zone.

13. The headrest of claim 12, wherein the side wings are movably mounted on the support structure.

14. The headrest of claim 13, wherein the side wings are pivotably mounted on the support structure.

15. A vehicle seat comprising a seating portion, a backrest, and a headrest according to claim 1, mounted on the backrest.

16. A noise-canceling headrest for a vehicle seat, comprising a central part and two side parts extending on either side of the central part, the headrest comprising at least one loudspeaker oriented towards a space intended to receive the head of a user, the headrest further comprising a microphone oriented towards the space, wherein
   either the headrest further comprises an interface with an audio source playback module that is external to the headrest, capable of transmitting an audio signal to the loudspeaker, or
   the headrest further comprises an audio source playback module that is internal to the headrest, capable of transmitting an audio signal to the loudspeaker, and wherein the headrest further comprises a noise sensor oriented towards the outside of the space, the headrest further comprising a signal processing circuit configured for:

receiving a noise signal from the sensor, and determining a noise correction function by taking the noise signal into account, receiving an error signal from the microphone, and updating the noise correction function by taking the error signal into account, generating a noise correction signal by applying the noise correction function to the noise signal, generating a control signal intended for the loudspeaker, by adding together the noise correction signal and the audio signal so as to cancel the noise, wherein the microphone is arranged in a lower part of the one of the two side parts.

* * * * *